United States Patent [19]

Petermann

[11] Patent Number: 4,819,760
[45] Date of Patent: Apr. 11, 1989

[54] LOCKING ARM FOR WELL TOOL

[75] Inventor: Steven G. Petermann, Plano, Tex.

[73] Assignee: Atlantic Richfield Company, Los Angeles, Calif.

[21] Appl. No.: 189,867

[22] Filed: May 3, 1988

[51] Int. Cl.⁴ .............................................. G01V 1/40
[52] U.S. Cl. .................................... 181/102; 367/911; 166/212
[58] Field of Search ............... 181/102, 103, 104, 105, 181/106; 367/25, 33, 35, 69, 911, 912; 166/66.4, 66, 214, 212, 206, 117.6

[56] References Cited

U.S. PATENT DOCUMENTS

| 2,699,001 | 1/1955 | McMahan | 367/911 |
|---|---|---|---|
| 3,978,939 | 9/1976 | Trouiller | 181/104 |
| 4,575,831 | 3/1986 | DeCorps et al. | 367/33 |
| 4,616,703 | 10/1986 | Laurent et al. | 166/66.4 |
| 4,715,469 | 12/1987 | Yasuda et al. | 181/102 |

Primary Examiner—Brian S. Steinberger
Attorney, Agent, or Firm—Drude Faulconer

[57] ABSTRACT

A well tool having a locking arm that is rapidly deployed by a long strike of a hydraulic piston having a small area and is locked in the deployed position by a short stroke of a hydraulic piston having a larger area.

11 Claims, 3 Drawing Sheets

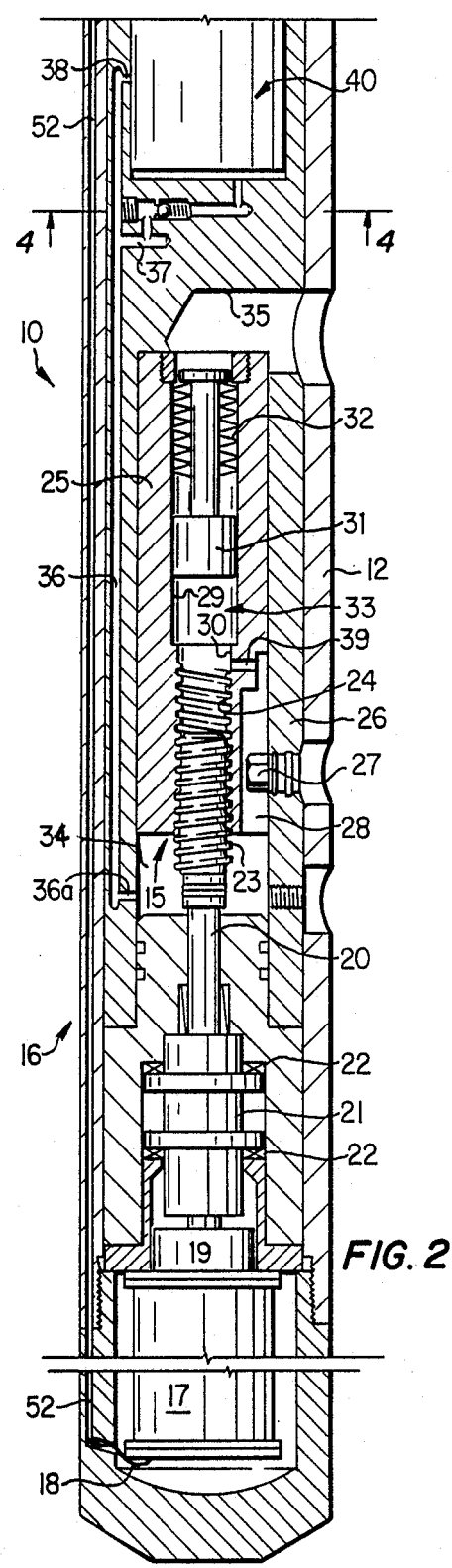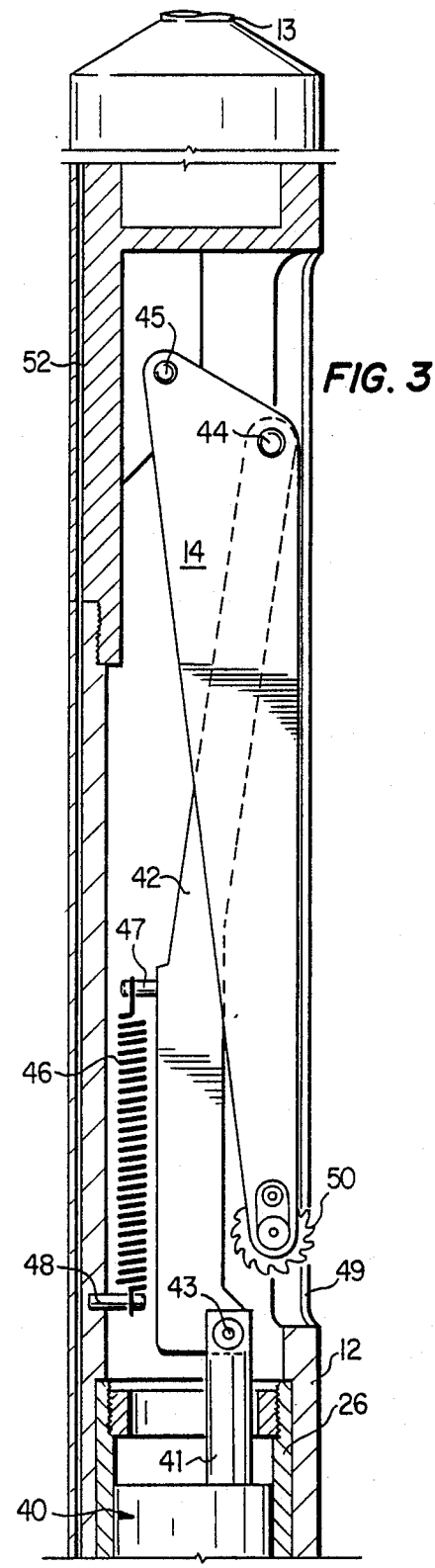

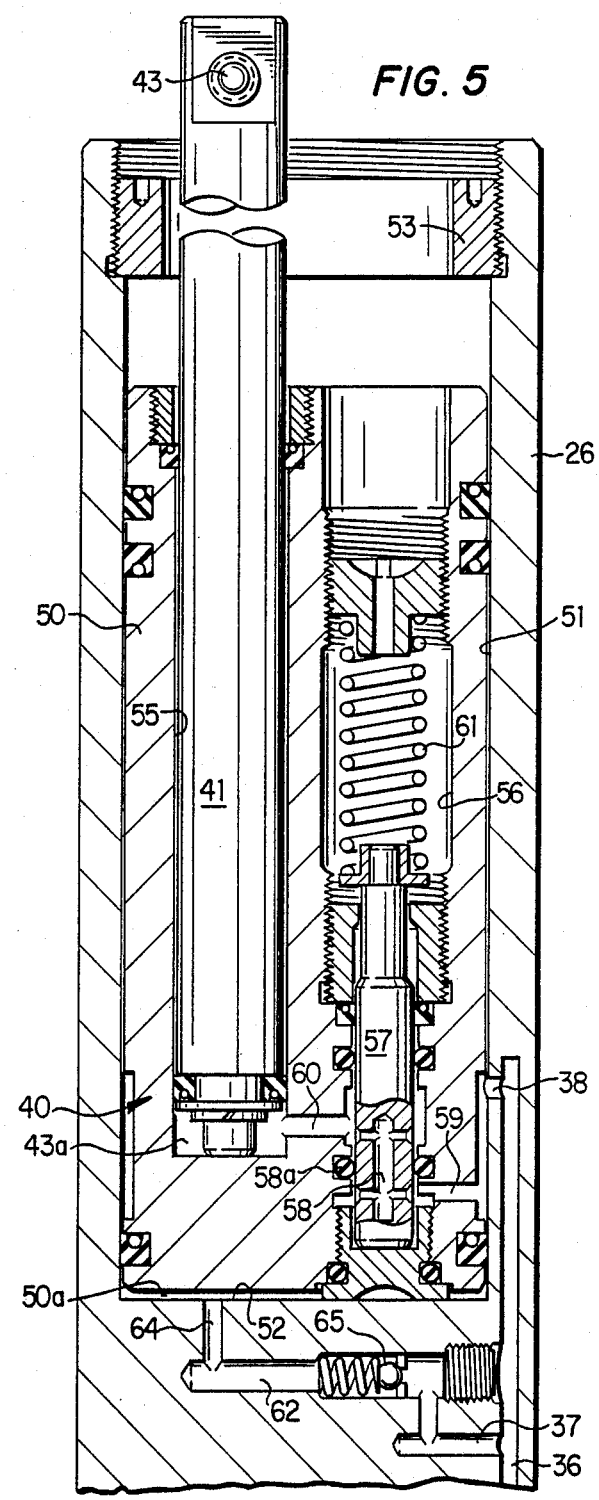

LOCKING ARM FOR WELL TOOL

DESCRIPTION

1. Technical Field

The present invention relates to a locking arm for a well tool and in one of its aspects relates to a two-stage locking system for quickly deploying a locking arm from a downhole well tool and then applying a substantial locking force on the arm to securely but releasably lock the tool in a set position within the well bore while the tool is operated.

2. Background Art

In carrying out certain logging operations in a wellbore, it is necessary to lower a particular well tool into the wellbore and secure it at various depths while the tool generates and/or gathers data. Such a well tool is one used in running vertical seismic profiles and is commonly referred to as a "VSP sonde". A typical VSP sonde carries at least three mutually perpendicular transducers which detect seismic signals and transmits the signals to a surface recorder through the cable on which the sonde is suspended in the wellbore. In order for the transducers to properly receive these signals, the sonde must be acoustically coupled to the wall of the wellbore at each of the various depths at which measurements are to be made. This requires the sonde to be pushed laterally into firm contact with the wellbore at each operational point and securely held or locked in that position until the operation at that point is completed. Then the sonde is released from engagement with the wellbore and is moved to another point where the operation is repeated.

In typical prior art sondes, the sonde is pushed into contact with the wall of the wellbore and is held there by a pivoted or telescopic "locking arm" which is carried in the housing of the sonde and is deployed and retracted upon signals from the surface. These locking arms are designed to be deployed radially from the housing to engage the wellbore wall and thereby exert sufficient force in a horizontal direction to push the housing of the sonde in an opposite direction against the wellbore and firmly hold it there during the operation of the sonde.

In known prior art sondes, a trade-off has had to be made between (1) the speed at which the arm can be deployed and retracted which directly affects the time the sonde is in the wellbore and (2) the high locking forces which are vital and necessary to secure the sonde in a stable position during operation. Most prior art sondes opted for the high locking forces which resulted in good wellbore coupling but sacrificed speed of deployment thereby substantially adding to the time and expense of the overall logging operations, especially those operations carried out in deep wells where the tool is operated at several points.

Accordingly, it can be seen that it would be highly beneficial if the time it takes the locking arm to be deployed can be substantially increased while, at the same time, the high locking forces on the arm, once deployed, can be maintained.

SUMMARY OF THE INVENTION

The preferred embodiment of the present invention provides a well tool, e.g., VSP sonde, which has a locking arm that is rapidly deployed and then firmly locked in the deployed position to hold the tool in a stable position while the tool is operated.

More specifically, the present tool comprises a housing having a locking arm pivotably mounted therein for movement between a retracted position and a deployed position. A first means, e.g., a piston having a relatively small cross-sectional area, is connected to the arm so that the arm is deployed when the small piston moves in one direction and is retracted when it moves in the other direction. The small area of the piston allows it to move rapidly through a relatively long stroke upon only a small volume of pressure fluid, e.g., hydraulic fluid, being applied thereto.

A second means, e.g., a piston having a relatively large cross-sectional area is provided in the housing which moves through a very short stroke to provide a high locking force on the arm after it has been deployed by the small piston. By using the small piston to rapidly deploy the arm, the time required to position the well tool is substantially reduced thereby reducing the expense of the well operation. At the same time, the large piston quickly applies the high locking forces on the arm which are necessary to firmly hold the well tool in a stable position during operation of the tool.

Still more specifically, the present invention provides a well tool wherein the small piston is positioned within a bore formed within the large piston and is actuated by operating a fluid pumped by a motor-operated screw pump which is mounted in the tool housing. Valves means in the housing allow all of the pumped fluid to flow to the small piston until the locking arm is moved to its deployed position and then directs the pumped fluid to the large piston to thereby provide the high locking forces on the deployed arm. The arm is unlocked and retracted by simply reversing the rotational direction of the screw pump. A pressure-compensating means is also provided in the housing whereby additional fluid is supplied to the large piston after the pump has stopped to thereby keep the arm firmly locked in the event unexpected movement of the tool causes the arm to deploy slightly further into the wellbore.

BRIEF DESCRIPTION OF THE DRAWINGS

The actual construction, operation, and apparent advantages of the present invention will be better understood by referring to the drawings in which like numerals identify like parts and in which:

FIG. 2 is a cross-sectional, partial view of the lower section of the well tool of FIG. 1;

FIG. 3 is a cross-sectional, partial view of the upper section of the well tool of FIG. 1;

FIG. 5 is an enlarged, sectional view of the means for deployment and locking the locking arm of the present well tool.

BEST MODE FOR CARRYING OUT THE INVENTION

Figure 1:
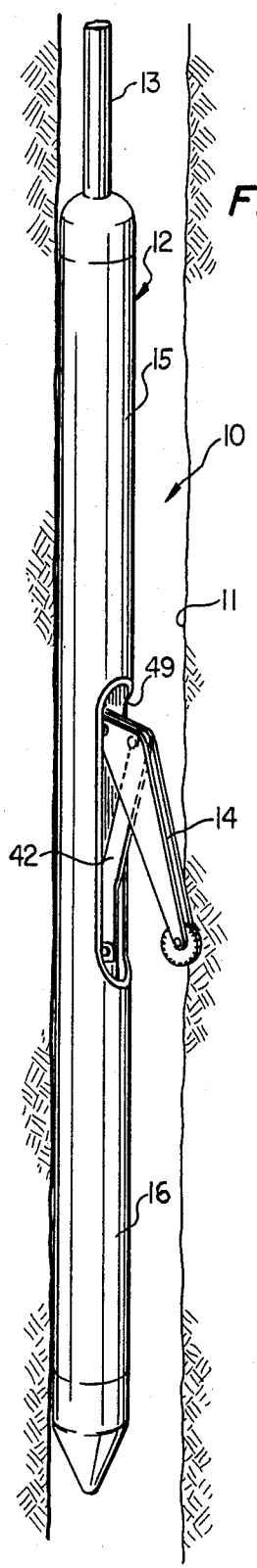
FIG. 1 is an elevational view, partly in section, of a preferred well tool in accordance with the present invention with the present tool shown in an operable position within a wellbore.

Referring more particularly to the drawings, FIG. 1 illustrates a preferred embodiment of the well tool 10 of the present invention in an operable position within wellbore 11 in which a downhole survey or logging operation is to be carried out. Well tool 10 is of the type having a housing 12 suspended on cable 13 and which is pushed into engagement with the wall of wellbore 11 and held there by locking arm 14. An example of a typical well tool 10 is one used in running vertical seismic profiles (VSP) and is commonly referred to as a VSP sonde.

A VSP sonde normally carries a plurality of transducers (not shown) in the upper part 15 of housing 12 which, in turn, are acoustically coupled to the wellbore 11 when locking arm 14 is actuated to push housing 12 laterally into contact therewith. The transducer detects seismic signals from the formations surrounding the wellbore 11 and transmits these signals to the surface through cable 13, as will be understood in the art. Since the details of the transducers, etc. of the sonde form no part of the present invention, no further description is considered necessary.

Turning now to the details of the locking arm 14 and the hydraulic mechanism for deploying and locking the arm in place, FIG. 2 discloses the internal construction of tool 10 within the lower portion 16 of housing 12. An electric motor 17 is mounted in the housing 12 and is adapted to be operated from the surface. Motor 17 has a splined, output shaft 19 which drives screw pump shaft 20 through thrust connection 21 which, in turn, is rotatably mounted within housing 12 on thrust bearings 22.

. Screw pump shaft 20 has male threads 23 thereon which mate with female threads 24 in pump plunger 25 for a purpose described later. Preferably, threads 23, 24 are pitched, e.g, Acme threads, so that plunger 25 cannot move unless screw shaft 20 is positively rotated by motor 17. Plunger 25 is mounted for longitudinal movement in sleeve 26 but is prevented from rotation movement with respect therewith by follower 27 which is secured to sleeve 26 and which slides within slot 28 in plunger 25.

Plunger 25 has a bore 29 in the upper end thereof which is in fluiud communication with the lower threaded bore 24 through passage 30. A pressure-compensating piston 31 is slidably mounted in bore 29 and is held in position by normally uncompressed bias means 32 (e.g., Belleville washers) to thereby define a pressure-compensation chamber 33 below piston 31. Chamber 33 is in fluid communication with the main pump reservoir 34 formed in sleeve 26 below plunger 25 via opening 39 and slot 28 in plunger 25. A radial opening 35 through both sleeve 26 and housing 14 communicates the upper end of pressure-compensating piston 31 with wellbore fluids when tool 10 is within wellbore 11 for a purpose described below. A passage 36 extends longitudinally through sleeve 26 to fluidly communicate pump reservoir 34 with passages 37, 38 to thereby provide fluid, e.g., hydraulic fluid, from reservoir 34 to arm actuating means 40, as will be more fully described later.

Referring now to FIG. 3, arm actuating means 40 has a small piston rod 41 extending therefrom which, in turn, has its upper end pivotably connected to the lowe end of bar 42 by pin 42. The upper end of bar 42 is pivotably connected to the front of the upper end of locking arm 14 by pin 44. The back of the upper end of arm 14 is pivotably fixed to housing 12 by pin 45 so that arm 15 is free to be rotated about pin 45 between a retracted position (FIG. 3) and a deployed position (FIG. 1) through window 49 in housing 12 when bar 42 is actuated by rod 41. Arm 14 is normally held in a retacted position by spring 46 which is secured at one end 47 to bar 42 and at its other end 48 to housing 12. Arm 14 preferably has a tooth wheel 50 mounted at its outer end which is adapted to engage the wall of the wellbore 11 when arm 14 is actuated. A lead(s) 51 from cable 13 (FIG. 2) extends through a passage 52 or the like in housing 12 to communicate power to the drive motor 17 in the lower portion of tool 10.

Figure 4:
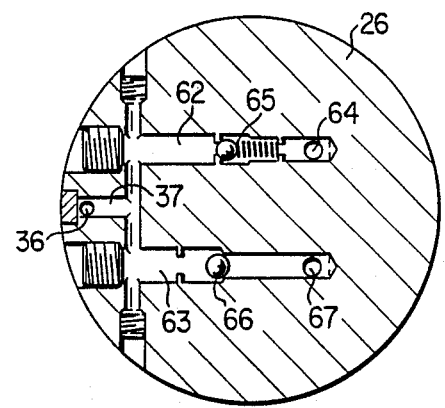
FIG. 4 is a sectional view taken along line 4—4 of FIG. 2.

Reference is now made to FIGS. 4 and 5 for the details of the arm actuating means 40 which is basically comprised of a small, fast acting piston 41 for rapid deployment of arm 141 and a large piston 50 for supplying high locking pressures to arm 14 once it has been deployed. Large piston 50 is slidably positioned in bore 51 which is formed in the upper end of sleeve 26 and can move between lower surface 52 of bore 51 and stop ring 53 at the upper end of bore 51.

Large piston 50 has two parallel bores 55, 56 therethrough. Small piston 41 is slidably positioned in bore 55 and, as set forth above, extends from the upper end thereof to be affixed to bar 42 by pin 43. Slidably positioned in bore 56 is sleeve valve 57 which, in turn, has a passage 58 therein which provides communication between passages 59, 60 in piston 50 when valve 57 is normally biased downward by spring 61.

Referring now to FIG. 4, longitudinal passage 36 fluidly communicates with parallel radial passages, i.e., inlet passage 62 and outlet passage 63. Inlet passage 62 has a spring-biased relief valve 65 or the like therein that allows flow from passage 36 into passage 64 only upon the application of a predetermined pressure, as will be further, described in the operation set out below. A caged-check valve 66 or the like is provided in outlet passage 63 to block flow from passage 37 but which freely allows flow in the direction from passage 67 to passage 37, as will be explained further below. With the structure of well tool 10 having been fully described, the operation thereof will now be set forth.

Reservoir 34 (FIG. 2) and all connecting passages and chamber 33 in tool 10 are filled with a fluid (e.g., hydraulic fluid). With arm 14 in its retracted position (FIG. 3), tool 10 is positioned at an operation point within wellbore 11. Motor 17 is actuated from the surface through lead 18 to rotate pump screw 23 within plunger 25 to move plunger 25 downward in sleeve 26 and thereby pump fluid from reservoir 34 through opening 36a and passage 36 to both passages 37 and 38. However, flow through passage 37 will be blocked by check valve 66 in outlet passage 63 and initially by relief valve 65 in inlet passage 62 until a preset pressure (e.g., 550 psi) is reached.

Accordingly, all of the fluid being pumped from reservoir 34 will initially flow through passage 38 into passage 59 and through the passage 58 in sleeve valve 57 to passage 60, through which the fluid flows in chamber 43a where it applies pressure to the bottom of small piston 41. The relatively large volume of fluid acting on the small area of piston 41 causes piston 41 to move upward rapidly in bore 55 thereby actuating bar 42 to rotate arm 14 about pivot 45 and quickly deploy arm 14 out against wellbore 11, thereby pushing housing laterally into contact with the wall of the wellbore.

When arm 14 engages the wall of the wellbore and has pushed the housing into firm contact therewith, the pressure in chamber 43a continues to build since fluid is still being pumped from reservoir 34. As pressure builds and small piston can move no further, the pressure of the fluid in passage 58 causes sleeve valve 57 to move upward against the bias of spring 61 (FIG. 5) until the lower portion of passage 58 moves past O-ring seal 58a thereby closing valve 57 and preventing further flow to chamber 43a. Now, the pressure of the fluid being pumped acts on relief-valve 65 to open flow through passage 62 so that fluid under pressure is pumped into chamber 50a to force large piston 50 upward (e.g., less than ¼ of an inch) in bore 51. Since the hydraulic fluid in chamber 43a is incompressible, movement of large piston 50 also moves small piston 43 an equal distance which firmly "locks" arm 14 in an operable position. The fluid acting on the large area of large piston 50 creates high locking forces on arm 14 which insures stability of tool 10 during its operation. When piston 50 has reached its maximum travel, motor 17 is turned off and pump 15 is stopped. This can be done by monitoring the current to the motor from the surface, with propely positioned limit switches, timing circuits, pressure sensors, or any equivalent means.

Referring again to FIG. 2, it can be seen that the upper end of pressure-compensating piston 31 is exposed to the well pressure, e.g., 10,000 psi, through port 35, which is preferably packed with grease as will be understood in the art. Since the bottom of large piston 50 is also exposed to the same well pressure through window 49, the pressure across the tool when arm 14 is retracted is initially balanced. Upon actuation of the pump, the pressure from reservoir 34 is also applied to pressure-compensating chamber 33 through slot 28 and opening 39. Increased pressure causes piston 31 to move up against the bias of bias means 32. After arm 14 has been deployed and locked, the pressure in chambers 33 and 34 will be substantially equal, e.g., 600 p.s.i. If, after pump 15 is stopped, arm 14 should accidently move outward during operation of tool 10, any increased volume of large piston chamber 50a caused by movement of arm 14 will quickly be filled with fluid since any decrease in pressure across the tool will cause bias means 32 to move piston downward to force fluid from chamber 33 through the system to fill any increase volume in large piston chamber 50a. This pressure-compensation system insures that arm 14 will remain in a fully deployed and locked position during the operation of tool 10 even where tool 10 might experience conditions which would otherwise "loosen" arm 14 thereby adversely affecting the acoustical coupling of the tool of the wellbore.

To retract arm 14, motor 17 is actuated to rotate screw shaft 20 in an opposite direction to thereby thread plunger 25 upwardly. This decreases the pressure in reservoir 34 thereby allowing fluid to flow from large piston chamber 50a through check valve 66 in passage 63 (FIG. 4). As pressure in passages 38, 36 decrease due to the flow of fluid back to reservoir 34, spring 61 opens valve 57 so that fluid from small piston chamber 43a is now free to flow to reservoir 34 as piston 41 is moved downward as spring 46 (FIG. 3) retracts arm 14 into housing 12. When arm 14 is fully retracted, motor 17 is stopped and tool 10 is ready to be moved to a new position in wellbore 11.

It can be seen that by using the small area of small piston 43 to move arm 14 through the majority of the distance required for deployment, the speed of deployment is substantially increased and the time and hence, the expense required to run surveys on logs is substantially reduced.

What is claimed is:
1. A well tool comprising:
a housing;
a locking arm mounted in said housing for movement between a retracted position and a deployment position;
a first piston for moving said arm from said retracted position to said deployed position; and
a second piston having a cross-sectional area larger than the cross-sectional area of said first piston for locking said arm in said deployed position wherein said first piston is slidably positioned within a bore formed in said second piston.
2. The well tool of claim 1 including:
a pump means in said housing adapted for supplying an operating fluid to said first and second pistons.
3. The well tool of claim 2 including:
a motor in said housing for actuating said pump means.
4. A well tool for carrying out an operation at several different points in a wellbore, said tool comprising:
a housing;
a locking arm mounted in said housing for movement between a retracted positon and a deployed position;
a first piston positioned in said housing;
means connecting said first piston to said locking arm whereby movement of said first piston in a first direction will move said arm to said deployed position and movement of said first piston in an opposite direction to move said arm to said retracted position
a second piston having a cross-sectional area larger than the cross-sectional area of said first piston positioned in said housing and being operably connected to said arm to apply a locking force to said arm when said arm is in said deployed position and said second position is moved in a first direction;
pump means in said housing for pumping fluid in said housing to and from said first piston and said second piston;
a motor in said housing for operating said pump means; and
valve means for supplying all of said fluid from said pump means to said first piston until said arm is moved to said deployed position and then to said second piston until said locking force is applied to said arm.
5. The well tool of claim 4 wherein said first piston is positioned with a bore formed in said second piston.
6. The well tool of claim 5 wherein said pump means comprises:
a sleeve having a fluid reservoir therein;
a plunger slidably mounted in said sleeve to move into and out of said reservoir, said plunger having a threaded bore therein;
a shaft connected to and rotated by said motor and having threads thereon which cooperate with said threaded bore in said plunger; and
means for preventing rotation of said plunger in said sleeve.
7. The well tool of claim 6 wherein said motor comprises:
a reversible, electric motor.
8. The well tool of claim 5 including:
a pressure compensation means in said housing for supplying additional fluid to said second piston while said pump means is stopped in the event said arm is moved while locking in said deployed position.

9. The well tool of claim 7 including pressure compensating means comprising:
- a pressure chamber in said plunger in fluid communication with said reservoir;
- a pressure piston slidably positioned in said pressure chamber;
- means for biasing said piston into said chamber; and
- passage means through said housing for exposing said pressure piston to pressures in a wellbore when said tool is positioned within a wellbore.

10. The well tool of claim 9 wherein said valve means comprises:
- a sleeve valve positioned in said second piston;
- means to bias said sleeve valve to an open position wherein fluid is flowed to said first piston until a predetermined pressure is reached whereupon said sleeve valve is moved against said bias means to a closed position; and
- a relief-valve adapted to open when said sleeve valve is in a closed position to thereby allow flow to said second piston.

11. The well tool of claim 10 wherein said tool is a vertical seismic profile sonde.

* * * * *

UNITED STATES PATENT OFFICE
CERTIFICATE OF CORRECTION

PATENT NO. : 4,819,760
DATED : April 11, 1989
INVENTOR(S) : Steven G. Petermann

It is certified that error appears in the above-identified patent and that said Letters Patent is hereby corrected as shown below:

Column 6, line 2, delete "deployment" and insert --- deployed ---.

Column 6, line 21, delete "positon" and insert --- position ---.

Column 6, line 29, after "position" insert a semi-colon.

Column 6, line 35, delete "position" and insert --- piston ---.

Column 6, line 67, delete "locking" and insert --- locked ---.

Signed and Sealed this

Fourteenth Day of November, 1989

Attest:

JEFFREY M. SAMUELS

Attesting Officer     Acting Commissioner of Patents and Trademarks